(12) United States Patent
Llorente González (10) Patent No.: US 8,084,874 B2
(45) Date of Patent: Dec. 27, 2011

(54) METHOD OF MAINTAINING WIND TURBINE COMPONENTS OPERATIONAL AND A TURBINE COMPRISING COMPONENTS SUITABLE FOR OPERATIONAL MAINTENACE

(75) Inventor: José Ignacio Llorente González, Pamplona (ES)

(73) Assignee: Gamesa Innovation & Technology, S.L., Zamudio (Vizcaya) (ES)

( * ) Notice: Subject to any disclaimer, the term of this patent is extended or adjusted under 35 U.S.C. 154(b) by 600 days.

(21) Appl. No.: 11/921,612

(22) PCT Filed: Jul. 14, 2006

(86) PCT No.: PCT/ES2006/000407
§ 371 (c)(1),
(2), (4) Date: Mar. 5, 2009

(87) PCT Pub. No.: WO2007/012682
PCT Pub. Date: Feb. 1, 2007

(65) Prior Publication Data
US 2009/0206603 A1    Aug. 20, 2009

(30) Foreign Application Priority Data
Jul. 22, 2005   (ES) .................................. 200501796

(51) Int. Cl.
*F03D 7/00*   (2006.01)

(52) U.S. Cl. ........................................... 290/44; 290/55
(58) Field of Classification Search .................... 290/44, 290/55; 415/1; 416/1; 322/44, 59, 89
See application file for complete search history.

(56) References Cited

U.S. PATENT DOCUMENTS

| | | | |
|---|---|---|---|
| 6,072,302 A * | 6/2000 | Underwood et al. | 322/17 |
| 2004/0145188 A1 * | 7/2004 | Janssen et al. | 290/44 |
| 2007/0029802 A1 * | 2/2007 | Moehlenkamp | 290/44 |
| 2007/0052244 A1 * | 3/2007 | Hudson | 290/44 |

FOREIGN PATENT DOCUMENTS

| | | |
|---|---|---|
| DE | 200 20 232 | 1/2002 |
| EP | 1 128 064 | 8/2001 |
| WO | 2005/015012 | 2/2005 |
| WO | 2005/017350 | 2/2005 |

* cited by examiner

*Primary Examiner* — Tho D Ta
(74) *Attorney, Agent, or Firm* — Ladas & Parry LLP (57) ABSTRACT

The invention relates to a wind turbine (1) which is connected to an electrical power grid (23) and which uses a magnet generator (6) as the only electrical power generator element both in the normal operation thereof and during periods in which the turbine is disconnected from the electrical power grid. The aforementioned wind turbine can perform operations in order to maintain the wind turbine systems operational, with the continued generation of electrical power, and to adjust the quantity of electrical power produced for power consumption during the periods in which the turbine is disconnected from the electrical power grid.

33 Claims, 3 Drawing Sheets

METHOD OF MAINTAINING WIND TURBINE COMPONENTS OPERATIONAL AND A TURBINE COMPRISING COMPONENTS SUITABLE FOR OPERATIONAL MAINTENACE

FIELD OF THE INVENTION

The present invention relates to the field of electric power generation of a utility grid connected wind turbine, and specifically to wind power generators capable of maintaining systems of the wind turbine operational subsequent to a utility grid failure.

BACKGROUND OF THE INVENTION

A first aspect of wind turbines relates to a requirement to be able to brake the rotor blades in the case of an emergency such as a utility grid failure. Therefore, wind turbines are often equipped with aerodynamic braking systems. The aerodynamic braking system functions by rotating the rotor blades, typically into a feathered position, so that the rotor blades are prevented from taking up power from the wind, thus achieving a deceleration of the rotor speed. The braking is often combined with a mechanical braking system as well.

Thus, when the rotor has been braked, the wind turbine is not able to supply itself with any electric power unless batteries, capacitors, or diesel engine driven generators are used. Not until the grid failure has been recovered and the utility grid connection has been re-established and the wind turbine is fully operational again is the generator itself capable of generating electric power. Therefore, the essential functions of different systems of the wind turbine, such as systems for lubrication, cooling, heating, de-icing etc. will stop working or will only work as long as the batteries, capacitors or diesel engines are operational during the period of the utility grid failure, implying that the wind turbine may not be in a condition to produce electric power at the moment of the recovering of the utility grid failure, if the utility grid failure is of a certain period of time.

A second aspect of wind turbines relates to the wind turbine needing time to bring the critical components back into an operational condition before a utility grid reconnection is possible. The duration of the preparation period may vary from seconds to hours or perhaps even days, depending on factors such as the duration of the utility grid failure and the outside temperature, the humidity and the wind conditions, all of which factors influence the essential functions of the wind turbine. For instance, it may be necessary to heat up the gearbox to an operational temperature, which may take hours.

It is possible to use auxiliary power supplies during the utility grid failure in order to maintain at least some of the critical components of the wind turbine operational during the utility grid failure and thereby making the period of time required for a reconnection independent of the duration of the utility grid failure and thereby reducing to a minimum the period of time required for the reconnection. However, the period of time when the critical components can be maintained operational is often limited due the limited energy storage capacity of the auxiliary power supply, unless power supplies such as diesel engine driven generators are used.

A third aspect of wind turbines relates to the braking of the rotor during utility grid failure. According to the first aspect, i.e. a requirement to be able to brake the rotor blades in the case of an emergency such as a utility grid failure by means of aerodynamic braking systems, the aerodynamic braking must be effected very fast so that the rotational speed of the rotor will not accelerate so much that it will be difficult braking the rotor or so much that the mechanical loads to the main shaft and the bearing will be to excessive. Thus, the structural stability and strength of vital parts of the wind turbine have to be dimensioned in respect of the strong forces and high torques, which may arise during braking.

EP 1 128 064 discloses an electric pitch change device for a wind turbine comprising a back-up power unit consisting of a least one auxiliary permanent magnet generator assigned to the rotor shaft. The auxiliary permanent magnet generator delivers electrical power to electric motors, which are used to rotate the rotor blades into their feathered position in the case of an emergency, e.g. a utility grid failure. The generators are connected to the electric motors via a contact, so that when the contact is switched the rotor blades will pitch into the feathered position and thereby the rotor will be braked. Furthermore, when the rotor stops rotating, the angular position of the rotor blades will remain unchanged. Thus, EP 1 128 064 describes a method of safely braking the rotor in a robust way, but it does not provide a method for fast reconnection to the utility grid.

WO 02/44561 describes a wind turbine having an auxiliary generator for supplying electric energy from the kinetic energy of the rotor shaft. A switch device is incorporated for switching between conducting electric energy from the main generator during normal operation and conducting electric energy from the auxiliary generator during a disconnection from the utility grid. The electric energy supplied during utility grid disconnection is used for pitching the rotor blades into a flag position or feathered position, thereby braking the rotor and the main generator. WO 02/44561 describes braking of the rotor by using an auxiliary generator when the wind turbine is disconnected from the utility grid, but it does not provide a method for fast reconnection to the utility grid.

DK 174 411 published in the English language describes a method for controlling the pitch of the blades during periods of utility grid disconnection. A control is established ensuring a rotational sped of the rotor and of the generator within the normal speed range, also during disconnection from the utility grid, and where the rotational speed of the rotor and of the generator is already within the normal speed range, when the wind turbine is reconnected to the utility grid. Thereby, it is possible to obtain a fast reconnection. However, DK 174 411 does not mention any means for operating systems of the wind turbine such as the pitch control system during the disconnection from the utility grid.

U.S. Pat. No. 5,907,192 describes a wind turbine where the rotational energy which is present in the rotor and the rotor shaft is used for generating power for the pitch control system during emergency braking subsequent to the wind turbine having been disconnected from the utility grid. U.S. Pat. No. 5,907,192 describes braking of the rotor by using kinetic energy present in the rotating parts of the wind turbine when the wind turbine is disconnected from the utility grid, but it does not provide a method for fast reconnection to the utility grid.

SUMMARY OF THE INVENTION

It may be an object of the present invention to provide a method for making the period of time required for a reconnection of a wind turbine to a utility grid independent of the duration of the utility grid failure, and thereby minimising the period of time required for the reconnection, subsequent to a utility grid failure. It may supplementary or alternatively be an object of the present invention to provide a wind turbine, which subsequent to braking, i.e. during utility grid disconnection, will neither suffer nor increase any mechanical or thermal damage during utility grid failure. Finally it may supplementary or additionally be an object of the present invention to provide a wind turbine, which during braking because of a utility grid disconnection will neither suffer nor increase any mechanical or thermal damage during utility grid failure.

One or more objects of the invention may be obtained by a first aspect of the invention incorporating applying a method of maintaining at least one critical component of a wind turbine operational, where at least one of said critical component comprises a consumer of electrical power, and where said wind turbine is connected to the utility grid and comprises at least one pitch-controlled rotor blade, said method comprising maintaining said critical component operational during a period of time during which the wind turbine is disconnected from the utility grid, using a magnet generator as the sole electrical power-producing element during periods of time when the wind turbine is connected to the utility grid as well as during periods of time when the wind turbine is disconnected from the utility grid, continuing producing electric power from the wind during a utility grid disconnection, adjusting an amount of the produced electrical power in order to keep the produced electrical power in balance with a required stochastic, time-dependent power consumption of a load of which at least one is an electric power consumer of the wind turbine.

According to a second aspect of the invention, said method comprises using the magnet generator as the sole electrical power-producing element when the wind turbine is re-connected to the utility grid, thereby using the magnet generator for producing active power as well as reactive power. When connecting a generator to the utility grid, either initially or subsequent to a utility grid disconnection, it is necessary when applying asynchronous generators to provide reactive electric power. This must be applied from the utility grid, and if one or more magnet generators are connected to the utility grid, these generators may assist in supplying the reactive power for other generators such as asynchronous generators also connected to the utility grid.

According to third aspect of the invention, said method comprises the step of a pitch of said at least one pitch-controlled rotor blade is adjusted by means of an electrically actuated pitch motor having a stochastic, time-dependent electric power consumption in balance with the produced electric power. By using the magnet generator of the wind turbine to power a pitch actuator in order to pitch the at least one pitch-controlled blade, the pitching may be performed in a controlled manner because electrical power for the pitch motor is readily available for a prolonged period of time subsequent to a utility grid disconnection. The controlled pitching compared to an emergency pitching reduces the forces and torques applied to the different components of the wind turbine.

Different parameters may be used when performing the controlled pitching. Thus, the pitch is adjusted as a function of at least one of the parameters selected from the group comprising wind velocity, rotational speed of rotor shaft, rotor shaft torque, rotational speed of generator shaft and electric power consumption. Which of the parameters is used when pitching is dependent on structural integrity of the wind turbine in question and on the environmental conditions such as the weather in situ of the wind turbine.

A preferred type of magnet generator is a permanent magnet generator having the ability of producing power independently of an external electric power supply. Other types of magnet generators that may be equally used, are generators such as generators comprising magnets that are magnetised during the period of time when wind turbine is connected to the utility grid, generators comprising magnets that are made from super conductive coils and generators comprising magnets that are structurally integrated with a synchronous or asynchronous induction generator.

In the context of the present invention, 'operational' means that the individual critical components of the wind turbine are in such a condition that the wind turbine is capable of producing electric power at the very moment that the utility grid connection is re-established.

The critical components of the wind turbine comprise at least one component from the non-exhaustive list of: yawing system, pitch system, lubrication system, cooling system, and heating system. By maintaining the critical components operational is to be understood that the critical components are exercised or otherwise maintained operational in order to avoid problems of sticking, icing, heating, cooling and humidity. The exercising may comprise the action of mechanical displacement, rotation, etc. of a critical component, or it may comprise the action of heating, cooling, de-icing or de-humidifying a critical component.

It is an advantage of the present invention that the wind turbine is capable of producing electric power during utility grid failure or utility grid black-out. The produced electric power may be used to power the consumers of electric power of the wind turbine, and it may even be used to supply consumers connected to a local utility grid, e.g. consumers on an island or other consumers within a limited section of the complete utility grid. Furthermore, the wind turbine may be used as a power supply in connection with establishment of wind turbine parks in deserted and/or remote places, and thereby render unnecessary diesel engine driven generators during utility grid failure.

Furthermore, the capability of the invention to produce electric power during a utility grid failure may be used in replacement of auxiliary power-producing devices such as diesel engine driven generators during the start of other wind turbines or power plants commonly known as a black start situation.

It is an advantage of the present invention that the wind turbine does not need a preparation time to make the critical components operational in advance of a reconnection to the utility grid. Thus, disadvantages such as lost production of energy and decrease of availability are avoided. It is another advantage that no additional power source apart from the sole magnet generator is required for maintaining critical components operational and for assisting a reconnection to the utility grid.

It is another advantage that the wind turbine can be maintained operational for the duration of even long-lasting utility grid failures, in principle as long as the wind velocity is above e.g. 0.5 meters per second. It is another advantage that mechanical and thermal damage is avoided during a utility grid failure. Furthermore, the strength requirements of the exposed components such as rotor blades and tower may be relaxed as compared to prior art wind turbines because it is possible to operate the yawing system, even during utility grid failure.

In a preferred embodiment of the invention said at least one pitch-controlled rotor blade is adjusted so that said amount of produced electric power is in balance with said stochastic, time-dependent electric power consumption. The at least one pitch-controlled rotor blade comprises a motor for pitching the at least one rotor blade and as such the at least one pitch-controlled rotor blade is both a critical component and a consumer of electrical power. It is an advantage of said embodiment that the produced electric power can be adjusted according the present consumption of electric power and as a related advantage that the rotational speed of the rotor can be controlled in order to keep the rotational speed within a predetermined range.

When the rotational speed of the rotor is maintained within a predetermined range, it is another advantage that mechanical and thermal damage is avoided during a utility grid failure. Furthermore, it is an advantage that the strength requirements of the exposed components such as rotor blades and tower may be relaxed as compared to prior art wind turbines because it is possible to operate the yawing system, even during utility grid failure.

In a preferred embodiment of the invention, the pitch is adjusted as a function of wind velocity. It is an advantage to include the wind velocity when determining a change in the pitch angle as this will enable a more precise prediction of the resulting rotor speed and thus of the electric power production.

In another possible embodiment of the invention, the pitch is adjusted alternatively or additionally as a function of other parameters selected from a group comprising: rotor speed, rotor shaft torque, stator voltage of the generator, and electric power consumption. It is an advantage that parameters, other than wind velocity, can be used alternatively or additionally to wind velocity measurement when a change in the pitch angle is determined. Hence, devices such as anemometers for measurement of wind velocity may be avoided or these alternative measurable parameters may provide means to obtain redundancy in the control loop of the pitch.

In a preferred embodiment of the invention, the produced electric power is kept in balance with the consumed electric power by measuring the frequency of the generator-produced voltage signal and using that measurement to adjust the pitch. It is an advantage that the method to maintain the produced electric power in balance with the consumed electric power is based on measuring the frequency of the generator-produced voltage signal, as this is a simple and reliable method.

In another possible embodiment of the invention, the produced electric power is kept in balance with the consumed electric power by alternatively or additionally measuring at least one parameter selected from a group comprising consumed electric power, rotational speed of the rotor shaft, and rotor shaft torque, and using that measurement to adjust the pitch. It is an advantage that parameters, other than the frequency of the generator-produced voltage, may be used alternatively or in addition to the frequency, as these alternative measurable parameters provide means to obtain redundancy in the control loop of the pitch.

In another possible embodiment of the invention, the produced electric power is kept in balance with the consumed electric power by alternatively or additionally measuring the power transferred to the utility grid so that said power remains approximately equal to zero, and wherein the measurement of the power is used for adjusting the pitch and/or parameters of the controller. By using this method it is possible to control the electric power generated by the wind turbine so that no power is transferred to the utility grid even without disconnecting the wind turbine from the utility grid.

A possible embodiment of the invention applies an electric converter for adjusting the frequency of the electric voltage signal generated by the magnet generator. Thereby, the frequency of the output voltage signal from the electric converter can be maintained at a constant number independent of the frequency of the voltage signal from the generator and independent of the rotational speed of the rotor.

A preferred embodiment of the invention comprises an electric converter for adjusting the voltage amplitude of the electric voltage signal generated by the magnet generator. Thus, the voltage amplitude of the output voltage signal from the electric converter can be maintained at a constant level independent of the voltage amplitude of the voltage signal from the generator and independent of the rotational speed of the rotor.

A possible embodiment of the invention comprises means for filtering the electric voltage signal generated by the magnet generator for reduction of harmonics in the voltage signal.

A possible embodiment of the invention comprises means for transforming the electric voltage signal generated by the magnet generator for provision of galvanic separation and voltage adaptation of said voltage signal.

In a preferred embodiment of the invention, at least one of the critical components: yawing system, pitch system, lubrication system, cooling system, heating system, and bearings of either one of the yawing system, the blades or the gearbox, is maintained operational during a utility grid failure with the advantage that the wind turbine does not need preparation time to make the critical components operational in advance of a reconnection to the utility grid. Thus, disadvantages such as lost production of energy and decrease of availability are avoided.

In a possible embodiment of the invention, power is being dissipated during the transition from one power-producing state to another power-producing state. The result is that during the time interval between the occurrence of the utility grid failure and the moment, when a balance between power production and power consumption has been established, an amount of residual energy will be dissipated. Thus, the wind turbine can be brought from one power-producing state to another power-producing state without risking electrical and mechanical damages.

In a possible embodiment of the invention, the wind velocity is estimated from measurements of a least one parameter selected from a group comprising produced power, rotational speed of rotor shaft, and rotor shaft torque, thereby avoiding the use of wind velocity measuring means such as anemometers.

In another possible embodiment of the invention a consumer only operational during the periods of time when the wind turbine is connected to the utility grid is used to consume an amount of power that is constant and greater than zero during the period of a utility grid failure. Thereby the relative variation in power consumption caused by consumers of electric power that are switched on and off in an unpredictable manner is reduced because the consumed amount of power never becomes lower than the constant amount of power consumed by the dummy consumer. This is an advantage because the relative variations of the pitch becomes corresponding smaller.

One or more of the objects of the invention is also obtained by a wind turbine intended for being connected to a utility grid, said wind turbine comprising at least one pitch-controlled rotor blade and a magnet generator intended for producing electric power during periods of time when the wind turbine is disconnected from the utility grid, and said wind turbine being provided with means capable of adjusting an amount of the produced electrical power so that the produced electrical power is in balance with a required stochastic time-dependent consumption of a load of which at least one load is an electrical power consumer of the wind turbine, and said wind turbine comprising a power-producing element capable of producing electric power during periods of time when the wind turbine is disconnected from the utility grid, said power-producing element being said magnet generator.

It is an advantage that the produced electric power can be adjusted according the present consumption of electric power and as a related advantage that the rotational speed of the rotor can be controlled in order to keep the rotational speed within a predetermined range. When the rotational speed of the rotor is kept within a predetermined range it is another advantage that mechanical and thermal damage is avoided during a utility grid failure as compared to an operational state where the wind turbine is actually connected to the grid. Furthermore, it is an advantage that the strength requirements of the exposed components such as rotor blades and tower may be relaxed as compared to prior art wind turbines because a possibility exists of operating the yawing system, even during utility grid failure.

It is another advantage that the wind turbine is capable of producing electric power during a utility grid failure. The produced electric power may be used to power the consumers of electric power of the wind turbine and it may even be used to supply consumers connected to a local utility grid, e.g. consumers on an island or other consumers within a limited section of the complete utility grid. Furthermore, the capability of the invention to produce electric power during a utility grid failure may be used in replacement of auxiliary power-producing devices such as diesel generators in the start-up of other wind turbines or power plants commonly known as a black start situation.

In relation to the above-mentioned advantages, it is an advantage of the present invention that the wind turbine does not need a preparation time to make the critical components operational before a reconnection to the utility grid, and thus disadvantages such as lost production of energy and decrease of availability are avoided.

Various types of magnet generators can be used, that is, generators comprising permanent magnets being preliminary fully magnetised, generators comprising magnets that are magnetised during the period when wind turbine is connected to the utility grid, generators comprising magnets that are made from super conductive coils and generators comprising magnets that are structurally integrated with a synchronous or asynchronous induction generator. Each type of generator has advantages over the other types such as advantages of cost, efficiency and reliability. A particular advantage of the permanent magnet generator is that the power producing ability of the permanent magnet generator is independent of an external electric power supply.

A preferred embodiment of the invention comprises a full converter capable of modifying the frequency of the voltage signal generated by said magnet generator, thereby adapting the frequency properties of the generator-produced voltage to satisfy the frequency properties as required by the utility grid, also during reconnection.

A preferred embodiment of the invention comprises a full converter capable of modifying the voltage amplitude of the voltage signal generated by said magnet generator, thereby adapting the voltage amplitude of the generator-produced voltage signal towards the voltage amplitude of the utility grid, also during reconnection.

The wind turbine preferably comprises at least one electric motor-driven actuator for adjusting the pitch so that the electric power production from the generator can be adjusted to meet the power consumption of the consumers of electric power. Alternatively, hydraulic motors or pneumatic motors can be used to drive the pitch actuators.

A possible embodiment of the invention comprises a filter for filtering the electric voltage signal generated by the magnet generator. The result of using a filter is a reduction of the harmonic distortion of the output voltage from the filter.

A possible embodiment of the invention comprises a transformer for the purpose of galvanic separation and voltage amplitude adaptation. Thus, firstly the transformer adapts the voltage amplitude of the generator-produced voltage signal to meet the voltage amplitude of the utility grid. Secondly, the transformer provides a galvanic separation between the generator and the utility grid.

Possibly, the wind turbine comprises at least one operational system selected from a group of: heating system, cooling system, lubricating system, de-humidification system, and de-icing system, wherein the purpose of said operational system is to maintain said critical components operational. For instance it may be required to cool components such as electronic components that otherwise become too hot during operation, and it may be required to heat components such as gearboxes in order to minimize wear. Likewise, mechanical components such as gearboxes need lubrication to avoid failures and to minimize wear. In harsh weather conditions it may furthermore be necessary to use systems for de-humidification and de-icing of critical components such as electronic components or rotor blades, respectively.

A possible embodiment of the invention comprises at least one DC-chopper. The DC-chopper is capable of dissipating residual power during the time interval between the occurrence of the utility grid failure, where the magnet generator is producing a large amount of electrical power and the moment, when a balance, during utility grid failure, between a reduced power production and the reduced power consumption has been established, thereby providing means for changing the state of the wind turbine from one power-producing state to another power-producing state without risking electrical and mechanical damages.

A preferred embodiment of the invention comprises means for estimating the wind velocity, said means being selected from a group of wind velocity-measuring means such as anemometers, means for measuring the rotational speed of the rotor shaft such as tachometers, rotor shaft torque measuring means such as strain gauges and power measuring means such as power meters. Anemometers provide direct and reliable measurements of the wind velocity. However, the wind velocity may alternatively or additionally be estimated from other measures such as the rotational speed of the rotor shaft in order to provide redundancy in the wind measurement system.

These and other aspects of the invention will be apparent from and described more in detail with reference to drawings and the embodiments described hereinafter.

BRIEF DESCRIPTION OF THE DRAWINGS

The invention will hereafter be described with reference to the drawings, where FIG. 1 schematically illustrates interconnections of the components of a wind turbine and the connection of the wind turbine to a utility grid.

DETAILED DESCRIPTION OF THE INVENTION

Figure 1:
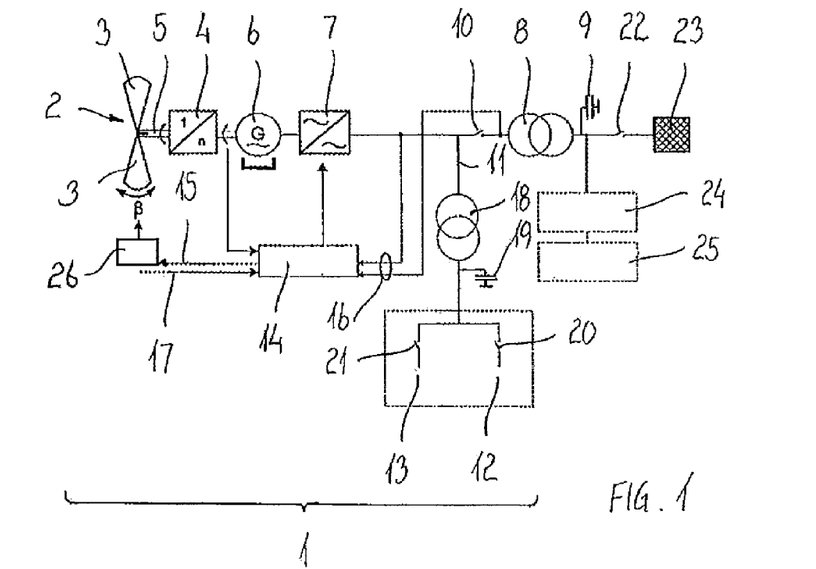

FIG. 1 shows a wind turbine 1 connected to a utility grid 23 via a switch 22. The wind turbine 1 comprises a rotor 2 having at least one rotor blade 3, a gearbox 4 and a rotor shaft 5 that drives a magnet generator 6. The magnet generator 6 produces electric power that is transferred to a converter 7. The converter 7 converts the voltage amplitude, the frequency, and the phase of the electric power signal before the electric power signal is transferred to a transformer 8 and a filter 9 via a switch 10.

In the context of this description it is necessary to distinguish between two operational states of the wind turbine: a first operational state is the normal situation in which the utility grid is not exposed to any failures; the wind turbine is connected to the utility grid, and the wind turbine is in a situation of normal power production. A second operational state is the situation in which the utility grid is exposed to a failure; the wind turbine is disconnected from the utility grid, and the wind turbine is in a situation of reduced power production. In the second operational state the wind turbine produces electric power only to its own consumers of electric power and possibly also to other turbines and perhaps external non-critical consumers.

In the situation of normal power production, the transformer 8 transforms the voltage of the electric power signal so that it equals the voltage amplitude of the utility grid and the filter 9 removes harmonic distortion of the electric power signal. If switch 10 and switch 22 are closed, a connection to the utility grid 23 is established, whereas in the case of a utility grid failure the wind turbine is disconnected from the utility grid by opening either switch 10 or switch 22, or both switch 10 and switch 22. By closing switch 10 and opening switch 22, the wind turbine is capable of supplying external critical consumers 24 and external non-critical consumers 25 with power while the remaining utility grid 23 is disconnected.

Each of the group of external critical consumers 24 and the group of external non-critical consumers 25 may include switches to disconnect or connect either of them, or both of them, to the transformer 8. The group of external critical consumers 24 may comprise such consumers that are dependent on Uninterruptible Power Supplies (known as UPS devices), and the group of external non-critical consumers may comprise other wind turbines, electrical consumers of households or electrical consumers of factories.

In another branch 11 of the electric circuit of FIG. 1 the electric power signal from the converter 7 is transferred to a transformer 18 and to a filter 19. The transformer 18 will transform the voltage amplitude to match the voltage amplitude required by the electric power consumers of the wind turbine itself, comprised of non-critical consumers 12 of electric power and critical consumers 13 of electric power. The filter 19 is responsible for removing harmonic distortion. The non-critical consumers 12 and the critical consumers 13 may independently of each other be disconnected from the electric branch 11 by means of a switch 20 and a switch 21.

The consumers of electric power of the wind turbine may be designed so that the transformer 18 is superfluous and as such can be omitted from the embodiment shown in FIG. 1. The filters 9 and 19 may be placed at other locations than shown in FIG. 1, e.g. in front of the transformers 8 and 18. Furthermore, the filters 9 and 10 may be omitted and replaced with a single filter that is placed directly after the converter 7. Alternatively, said single filter may be integrated with the converter 7.

A control system 14 of the wind turbine is responsible for adjusting the pitch of the rotor blades 3 and thereby responsible for adjusting the rotational speed of the rotor 2 and thus responsible for the amount of produced electric power from the magnet generator 6. The control system 14 controls at least one electric pitch actuator 26 via control of signal 15 in order to pitch the rotor blades 3 until a desired pitch of the rotor blades 3 has been obtained. A grid-measuring device 16 supplies the control system 14 with information about the power consumption of the wind turbine itself from non-critical consumers 12 and the critical consumers 13 as well as the power consumption of the consumers of the utility grid 23, other turbines 24 and possible external non-critical consumers 25. Furthermore, the control system is supplied with information via another control signal 17 about the wind speed and the rotational speed of the rotor shaft 5. The control system 14 is also responsible for controlling the converter 7.

The magnet generator 6, may be a permanent magnet generator, a permanent magnet synchronous generator or another type of permanent magnet generator. The magnet generator 6 may also be a type having magnets that are magnetised during said first operational state in which the utility grid is not exposed to any failures. During the second operational state in which the utility grid is exposed to a failure and the wind turbine is disconnected from the utility grid the magnetised magnets enables production of electric power. However, due to the properties of the magnetised magnets the magnetic field of the magnets will gradually reduce in strength until the utility grid connection is re-established after the recovery of the utility grid failure. Furthermore, the magnets of the magnet generator may be made from super conductive coils. In another embodiment magnets may be integrated with a synchronous or asynchronous induction generator so that when the wind turbine is disconnected from the utility grid and no external power supply is available for magnetisation of the synchronous or asynchronous generator windings the magnets still enables production of electric power.

Any of the generator types described above is used both for production of electric power during the normal power-producing situation when no utility grid failures are present and for production of power during the period of a utility grid failure. The magnet generator has the ability of producing power without the need for auxiliary power sources such as required by asynchronous induction generators. Thus, even in a utility grid failure situation where the wind turbine is disconnected from any external power suppliers, the wind turbine is capable of producing electric power.

The rotor 2 comprising at least one rotor blade 3 transforms the wind energy into rotations of the rotor shaft 5. The rotational speed of the rotor shaft 5 may need to be increased or decreased by a gearbox 4 in order to obtain a maximum power output from the permanent magnet generator 6. The gearbox is not required in wind turbines with permanent magnet generators characterised by at large number of poles.

The rotational speed of magnet generators is allowed to vary according to the speed of the wind and, therefore, the frequency of the voltage signal from the generator varies accordingly. Since the frequency of the voltage signal of the utility grid is constant the varying frequency of the voltage signal from the generator must be transformed to satisfy the frequency requirement of the utility grid. For that purpose a converter is used. The converter rectifies the electric current signal from the magnet generator into a DC signal (direct current signal), which is possibly filtered and amplified, after which the DC signal is inverted into an AC (alternating current) signal with the required frequency, preferably a frequency that is constant and equal to the frequency of the voltage signal of the utility grid. A filter may succeed the inverter in order to reduce the harmonic distortion of the voltage signal.

In the case of a utility grid failure the grid-measuring device 16 will sense the grid failure and subsequently the controller 14 will cause at least one of the switches 10 and 22 to open and thereby disconnect the wind turbine from the utility grid 23 and possibly from the other turbines 24 and from the possible non-critical consumers 25. Due to the ability of the magnet generator to produce power without any external power supply the generator is capable of continuing producing power during the period where wind turbine is disconnected from the utility grid. Therefore the wind turbine is capable of producing power for its own consumers of power comprising non-critical consumers 12 and critical consumers 13.

The one or more critical consumers 13 of electric power comprise those components of the wind turbine that must be maintained operational during a utility grid failure or which is at least advantageous maintaining operational during a utility grid failure. An non-exhaustive list of critical consumers comprises: At least one pitch actuator, a controller, a converter, a yawing system, a lubrication system, a cooling system, a heating system, a de-icing system, and a de-humidifying system. The non-critical consumers of electric power comprise those components of the wind turbine that do not need to be maintained operational during a utility grid failure, such as auxiliary computers, installations having a limited electrical power consumption and service equipment.

The critical consumers 13 of electric power of the wind turbine are part of the group of critical components that must also be maintained operational during a utility grid failure. In addition to the group of critical consumers, a non-exhaustive list of critical components comprises: Gearbox, one or more bearings, at least one rotor blade, a yawing system and a pitching system.

Thus, all critical components of the wind turbine can be maintained operational during the period of a utility grid error. Maintaining the critical components operational is to be understood as the critical components being exercised or otherwise maintained operational in order to avoid problems of sticking, icing, heating, cooling and humidity. The exercising may comprise the action of mechanical displacement or rotation of mechanical parts such as a pitching system, a gearbox, a yawing system and bearings in order to avoid such problems as sticking and icing.

Furthermore, the exercising may comprise the action of heating or cooling e.g. in cold weather heating a lubricant of the gearbox 4 and heating the lubrication systems as such or in hot weather cooling e.g. the lubricant of the gearbox 4 and the electric components such as the converter 7. Also, the exercising may comprise the action of heating, cooling, de-icing or de-humidifying individual critical components or the entire nacelle in order to maintain the wind turbine in a temperature-controlled condition even in harsh environmental conditions.

One advantage of maintaining the critical components of the wind turbine operational during a utility grid error is that the period of time required for a reconnection of a wind turbine to a utility grid subsequent to a utility grid failure will be independent of the duration of the utility grid failure and, thus, the period of time required for the reconnection is minimised. Hence, the wind turbine does not need a preparation time to make the critical components operational in advance of a reconnection to the utility grid. Thus, disadvantages such as lost production of electric energy and decrease of availability of the wind turbine are avoided. Due to the properties of the magnet generator no additional power source apart from the sole magnet generator is required for maintaining critical components operational. Therefore, the wind turbine can be maintained operational for the duration of even long-lasting utility grid failures, in principle any time when the wind velocity is above e.g. 0.5 meters per second.

By maintaining the wind turbine operational another advantage is obtained, namely that wear and damage is avoided since components such as magnets of the generator, gearbox and bearings (e.g. bearings of the pitch actuators and of the yawing systems) are maintained at an ideal temperature and humidity. Furthermore, the strength requirements of the exposed components such as rotor blades and tower may be relaxed as compared to prior art wind turbines because a possibility exists of operating the yawing system, even during utility grid failure. Thereby it is possible to adjust the position of the rotor in an ideal way, e.g. so that the rotor is facing the direction of the wind.

It is another advantage that the electric power produced by the wind turbine in addition to supplying the consumers of power of the wind turbine itself can also supply other turbines such as other wind turbines equipped with asynchronous generators. External non-critical consumers such as consumers on an island or other consumers within a limited section of the complete utility grid may also be supplied with electric energy during the period of a utility grid failure. The electric power-producing capability of the magnet generator may even be used to supply the generators of a power station in a situation of a so-called black start of a utility grid.

During the period of the utility grid failure, during which period the wind turbine is maintained operational, the amount of produced electric power must be adjusted to equal the amount of consumed electric power in order to control the rotational speed of the rotor 2. If the produced amount of electric power is greater than the consumed amount of electric power a runaway situation will occur. Oppositely, if the produced amount of electric power is less than the consumed amount of electric power, the rotor will be decelerated and possible stopped.

The consumed electric power varies due to the changing power consumption of the consumers of electric power, e.g. consumers of electric power may be switched on and off in an unpredictable manner. Therefore, the produced electric power must be adjusted according to the stochastic, time-dependent power consumption of the loads of the consumers of the wind turbine itself and external power consumers such as other wind turbines and possible non-critical consumers. The amount of produced electric power is adjusted by increasing or decreasing the pitch of the at least one rotor blade 3.

Because of the stochastic, time-dependent consumption of power the consumed power may instantly change from zero to a maximum value. This situation makes heavy demands to the pitch system that needs to adjust the pitch corresponding to the variation in consumed power. However, by using a dummy consumer of electric power that consumes an amount of power that is constant and greater than zero during the period of the utility grid failure the relative variation in power consumption is reduced because the consumed amount of power never becomes lower than the constant amount of power consumed by the dummy consumer and, thus, the relative variations of the pitch becomes corresponding smaller.

The controller 14 generates a pitch signal 15 in the form of an electric voltage signal, used to drive or affect the at least one pitch actuator 26 such as an electric motor or a hydraulic actuator, which in turn will increase or decrease the pitch angle .beta. of the at least one rotor blade 3. If the consumption of power suddenly drops, this will cause an acceleration of the rotor 2 and thereby increase the rotational speed of the rotor shaft and consequently the frequency of the voltage signal generated by the magnet generator 6.

Therefore, measurements of the rotational speed of the rotor shaft may be used by the controller 14 to determine the pitch signal 15, so that the produced amount of power remains equal to the consumed amount of power. Alternatively or additionally, measurement of the frequency of the voltage signal of the generator may be used in stead of or in addition to measuring the rotational speed of the rotor shaft, and used by the controller 14 to determine the pitch signal 15 so that the produced amount of power remains equal to the consumed amount of power. Other actions such as measurement of the wind speed 17, measurement of consumed electric power, measurement of rotor shaft torque and determining the actual pitch may alternatively or additionally be used individually or in combination by the controller for determining the pitch signal 15.

Alternatively the produced electric power may be kept in balance with the consumed electric power by alternatively or additionally measuring the power transferred to the utility grid so that said power remains approximately equal to zero. The power transferred to the utility grid could be measured at a position between the switch 10 and the grid 23. If the measured power differs from zero the pitch and/or the parameters of the controller 14, such as the phase between voltage and current signals, are adjusted until the active power transferred to the utility grid becomes approximately equal to zero.

By using this method it is possible to control the electric power generated by the wind turbine so that no power is transferred to the utility grid even without disconnecting the wind turbine from the utility grid. Thus, the switch 22 and 10 could be removed according to this method.

During the normal power-producing situation, where no utility grid failure is present, the pitch is adjusted in accordance with other parameters reflecting the conditions for producing the largest possible amount of electric power, requirements for maintaining the rotational speed of the rotor within a specified range and/or requirements for avoiding damages of the components of the wind turbine.

The control system comprising a controller 14 and the at least one pitch actuator 26 described above in connection with the method for adjusting the pitch during the period of a grid failure may be adapted for use as pitch control during the normal power producing situation possibly by modifying certain control parameters such as changing the control algorithms and changing the influence of input measurements to the controller 14.

The above-mentioned input to the controller 14 may be measured with at least one of the following devices such as devices for measuring the rotational speed of the rotor shaft known as tachometers or encoders, or devices for measuring the frequency of the voltage signal known as frequency counters, or devices for measuring the wind speed know as anemometers, or devices for measuring the consumed electric power known as power meters, or devices for measuring the rotor shaft torque known as torque meters.

The measurements of different quantities such as rotor speed, frequency of a voltage signal, wind speed, and consumed electric power may supplement each other in such a way that e.g. the controller 14 is failure-tolerant to the breakdown of one measuring device. For instance if the tachometer falls so that measurements of the rotor speed are no longer reliable, the measurements from the frequency counter may be used instead, or if the anemometer fails so that wind speed measurements are no longer available, the wind speed may be estimated from other measurements such as measurements of the produced electric power and the rotor speed.

FIG. 1 shows a converter 7 that is used for adapting the frequency of the voltage signal delivered by the magnet generator 6. Said frequency varies according to the variations of the rotor speed. However, since the consumers of electric power require a constant frequency, the converter must be capable of transforming the input voltage signal with a varying frequency to an output voltage signal with a constant predetermined frequency. The voltage amplitude of the voltage signal delivered by the magnet generator 6 may also vary according to the variations of the rotor speed. However, since the consumers of electric power require constant voltage amplitude, the converter must also be capable of adjusting the voltage amplitude of the input voltage signal so that the output voltage signal has constant voltage amplitude. Furthermore, the converter may be capable of changing the phase between voltage and current signals for adjustment of the production of active and reactive power. The converter may also comprise filter means for reduction of harmonic distortion. Converters with the above-mentioned properties are known as full converters, frequency converters, matrix converters, back-to-back converters and power converters.

The transformer 8 is used to further adapt the voltage amplitude of the voltage signal transmitted from the converter 7 to match the voltage amplitude of the utility grid. A filter 9 used for removing harmonic distortion of the voltage signal may be placed before or after the transformer 8. The transformer 8 also provides galvanic separation between the wind turbine and the utility grid.

During the time interval between the occurrence of the utility grid failure and the moment when a balance between the power production and the power consumption has been established, a residual amount of energy stored as kinetic energy of the rotating parts of the wind turbine needs to be dissipated. The duration of the transition from the one power-producing state to the other power-producing state typically lasts from 0.1 seconds to 10 seconds. A devise often used for dissipation of electric power during such short periods of time is a DC-chopper. In some situations the duration of a utility grid failure is within the range from 0.1 seconds to 10 seconds and in such cases the DC-chopper alone may be capable of handling the utility grid failure. The electric power could also be dissipated by allowing the rotor 2 to accelerate, by using a motor to accelerate a heavy flywheel or simply by the use of a resistor.

Figure 2:
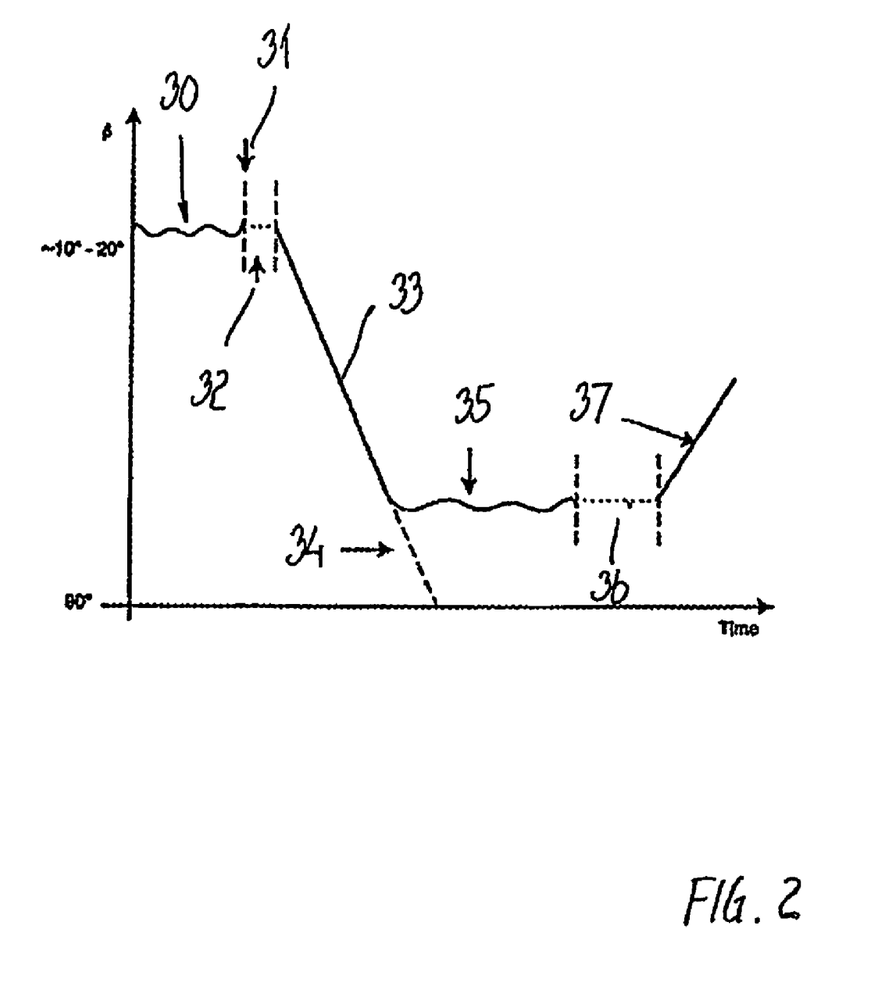
FIG. 2 shows a diagram of the pitch value change as a function of time in the case of the occurrence of utility grid failure.

FIG. 2 shows a graph that gives the relation between the pitch $\beta$ along the ordinate axis and the time along the abscissa axis. In the beginning during a time interval 30 the pitch has a value corresponding to a normal power-producing situation, where the pitch of the rotor blades typically lies within the range from −5 to 20 degrees or within the range from 10 to 20 degrees. At some instant at a random moment of time 31 the grid-measuring device 16 (see FIG. 1) detects that no connection to the utility grid is present, an indication of a possible grid failure. During a time interval 32 it is verified whether the utility grid failure persists and concurrently a DC-chopper or other device for dissipating electric power dissipates any residual energy supplied from the magnet generator. The duration of the time interval 32 is typically from 3 to 5 seconds.

If the utility grid does not recover from its failure within a period of typically 5 seconds the switch 10 and/or the switch 22 (see FIG. 1) are opened in order to deliberately disconnecting the wind turbine 1 from the utility grid 23. Subsequent to this action the pitch of the rotor blades is changed to a predefined value during a transition period 33. The change of the pitch to a predefined value may be combined with or may be substituted with a procedure where the pitch is adjusted in a feedback control loop during the transition period 33 until the amount of power produced by the magnet generator equals the consumed amount of power so that the rotor rotates at a constant speed.

A typical procedure for handling a utility grid failure, as disclosed in by the prior art, is to change the pitch e.g. to 90 degrees, as shown by the dashed line 34, so that the rotational speed of the rotor is decelerated to a very low speed or possibly stopped. After the transition period 33 the wind turbine is in a state 35 operating in a self supply mode where the magnet generator of the wind turbine produces power for its own consumers of electric power, i.e. non-critical consumers 12 and/or critical consumers 13 (see FIG. 1) and possibly to other turbines 24 (see FIG. 1) and possible external non-critical consumers 25 (see FIG. 1).

During the period where the wind turbine is in the state 35 the pitch is constantly adjusted so that the produced amount of power equals the consumed amount of power and consequently the rotor speed is kept within an optimal range in relation to the self-supply mode. The duration of the state 35 may be seconds, minutes, hours or days if the wind velocity remains above e.g. 0.5 meters per second being a possible lower limit for the wind to still operate the rotor. After the utility grid has recovered from its failure and after a period of time 36 wherein it is verified whether the recovery persists, the pitch is adjusted during a period 37 until the normal power-producing situation has been established.

Figure 3:
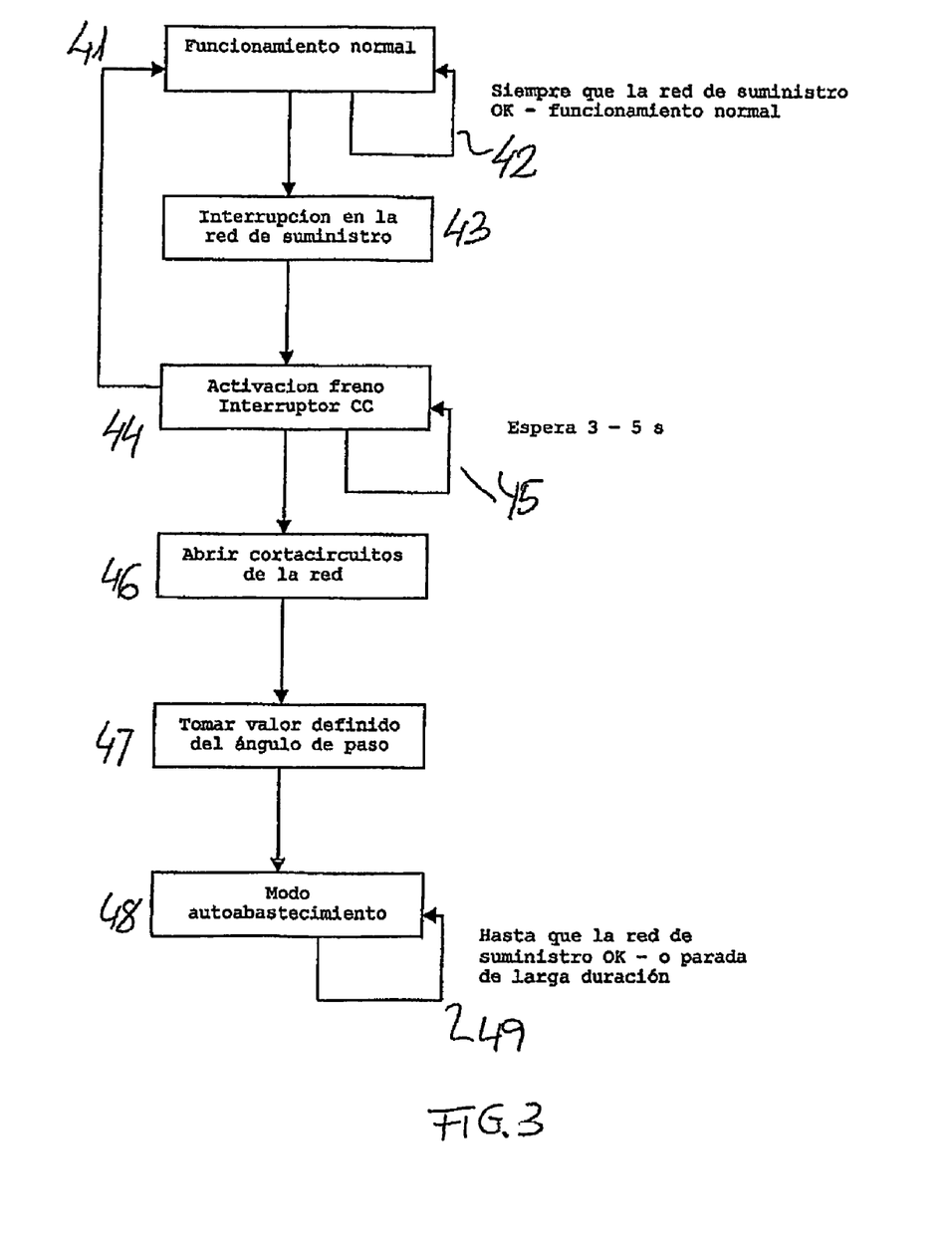
FIG. 3 shows the state changes of a wind turbine involved in connection with the occurrence of utility grid failure.

FIG. 3 illustrates the transitions involved in a change from the normal power producing state to the state, i.e. the self supply mode, where the wind turbine produces power for its own consumers of electric power and possibly other turbines and external non-critical consumers. In the first state 41 the wind turbine is in the normal power-producing situation, the wind turbine remains in the state 41, indicated by the loop 42, as long as no utility grid failures are detected by the grid-measuring device 16 (see FIG. 1). If the grid-measuring device detects that the utility grid is gone, thus indicating a utility grid failure the state of the wind turbine is changed into state 43, which is succeeded by state 44 wherein the DC-chopper or other device for dissipating electric power is activated in order to dissipate residual energy.

In state 44 it is verified whether the utility grid failure persists. The wind turbine remains in state the 44 for a period of time, indicated by the loop 45, within a duration of typically 3 to 5 seconds. If the utility grid recovers from its failure within the period of typically 5 seconds the state of the wind turbine may revert to the normal power producing state 41. Otherwise, if the utility grid does not recover from its failure within the period of typically 5 seconds, the state of the wind turbine is changed to state 47 by opening the grid circuit breakers, i.e. the switch 10 and/or the switch 22. This task is performed in state 46 intermediate state 45, where the utility grid condition is verified, and state 47, where the self-supply mode is fully initiated.

In state 47 the pitch of the rotor blades is changed to a predefined value. The change of the pitch to a predefined value in state 47 may be combined with or substituted with a procedure where the pitch is adjusted in a feedback control loop where the produced amount of power equals the consumed amount of power so that the rotor rotates at a constant speed. Subsequent to the step where adjusting the pitch has been achieved in state 47, the state of the wind turbine is changed to state 48. The wind turbine remains in state 48 as long as the utility grid connection is disrupted, i.e. as long as the utility grid failure persists, as indicated by the loop 49. The loop 49 is terminated if the grid-measuring device 16 (see FIG. 1) detects a recovery of the utility grid, which in turn will cause a change to the normal power-producing situation of state 41.

The loop 49 is also terminated if the situation requires a stop of the wind turbine. Such a situation may be caused for instance by extreme weather conditions, requirements for repair of the wind turbine or due to any kind of safety precautions.

Due to the capability of the wind turbine of producing power without the need for external power supplies the wind turbine can be used to supply asynchronous induction generators of other wind turbines, gas turbines or diesel generators with power during a utility grid failure. Thus, in a limited section of a utility grid comprising at least one wind turbine with a magnet generator and a number of other wind turbines with asynchronous induction generators or other power producing machines equipped with asynchronous induction generator the wind turbine equipped with the magnet generator will be capable of producing power required for the magnetisation of the e.g. the wind turbines with asynchronous induction generators so that they can be maintained operational.

Another utilisation of the ability of the wind turbine to produce power without the need for external power is in a so-called black start of a utility grid. Subsequent to a utility grid failure and thus a utility grid break down, a power station will need an external power supply for powering auxiliary helping equipment before the power station is able to re-establish the utility grid. Today, power-producing machines such as gas turbines or diesel generators driving a generator are sometimes used as an external power supply for magnetisation of the asynchronous induction generator of the power station.

The invention claimed is:

1. A method of maintaining at least one critical component of a wind turbine operational during a period of time when the wind turbine is disconnected from a utility grid, and where at least one of said critical components comprises a consumer of electrical power, and where said wind turbine is intended for being connected to the utility grid and comprises at least one pitch-controlled rotor blade, said method comprising using a magnet generator as a sole electrical power-producing element during periods of time when the wind turbine is connected to the utility grid as well as during periods of time when the wind turbine is disconnected from the utility grid, continuing producing power from the wind during a utility grid disconnection, and adjusting an amount of the produced electrical power in order to keep the produced electrical power in balance with a required stochastic, time-dependent power consumption of a load of which at least one is an electrical power consumer of the wind turbine.

2. A method according to claim 1, said method further comprising using the magnet generator as the sole electrical power-producing element during periods of time when the wind turbine is re-connected to the utility grid, thereby using the magnet generator for producing active power as well as reactive power.

3. A method according to claim 1, wherein a pitch of said at least one pitch-controlled rotor blade is adjusted by means of an electrically actuated pitch motor having a stochastic, time-dependent electric power consumption in balance with the produced electric power.

4. A method according to claim 3, wherein the pitch is adjusted as a function of at least one of the parameters selected from the group comprising wind velocity, rotational speed of rotor shaft, rotor shaft torque, rotational speed of generator shaft, and electric power consumption.

5. A method according to claim 1, wherein the magnet generator is a type comprising permanent magnets, which magnets are already fully magnetized preliminary to the periods of time when the wind turbine is connected to the utility grid, as well as preliminary to the periods of time when the wind turbine is disconnected from the utility grid.

6. A method according to claim 1, wherein the magnet generator is a type comprising magnets, which magnets are being magnetized during the periods of time when the wind turbine is connected to the utility grid, and which are being gradually demagnetized during the periods of time when the wind turbine is disconnected from the utility grid.

7. A method according to claim 1, wherein the magnet generator is a type comprising already fully magnetized magnets, which magnets are structurally integrated with a synchronous or asynchronous induction generator, and which magnets are magnetically independent from stator windings of the synchronous or asynchronous induction generator.

8. A method according to claim 1, wherein the magnet generator is a type comprising magnets being in magnetized by the generator, which magnets are structurally integrated with a synchronous or asynchronous induction generator, and which magnets are magnetically dependent of any stator windings of the synchronous or asynchronous induction generator.

9. A method according to claim 1, wherein the produced electric power is conducted through a converter before being supplied to the at least one critical component, and where the converter is a full converter.

10. A method according to claim 1, wherein the produced electric power is maintained in balance with the consumed electric power by measuring at least one of the following parameters: the voltage, the current, and the power produced by the generator and wherein the measurement of the voltage, the current or the power is used for adjusting a pitch.

11. A method according to claim 1, wherein the produced electric power is maintained in balance with the consumed electric power by alternatively or additionally measuring at least one parameter selected from a group comprising consumed electric power, rotational speed of rotor shaft, rotational speed of the generator shaft, and rotor shaft torque, and wherein the measurement of the parameter in question is used for adjusting a pitch.

12. A method according to claim 1, wherein the produced electrical power is maintained in balance with the consumed electric power by alternatively measuring the electrical power supplied to the utility grid so that said the electrical power supplied to the utility grid remains approximately equal to zero, and wherein the measurement of the power is used for adjusting a pitch.

13. A method according to claim 1, wherein the produced electrical power is maintained in balance with the consumed electric power by additionally measuring the electrical power supplied to the utility grid so that said the electrical power supplied to the utility grid remains approximately equal to zero, and wherein the measurement of the power is used for adjusting a pitch.

14. A method according to claim 1, said method further comprising applying an electric converter for adjusting a frequency of the electric voltage signal being output from the converter.

15. A method according to claim 1, said method further comprising means for adjusting a voltage amplitude of the electric voltage signal generated by said magnet generator.

16. A method according to claim 1, said method further comprising means for filtering the electric voltage signal generated by the magnet generator.

17. A method according to claim 1, said method further comprising means for transforming the electric voltage signal generated by the magnet generator.

18. A method according to claim 1, wherein at least one of the critical components selected from the group of yawing system, pitch system, lubrication system, cooling system, de-humidification system, de-icing system, and heating system is maintained operational.

19. A method according to claim 1, said method further comprising the step of dissipating power during the transition from one power-producing state to another power-producing state.

20. A method according to claim 1, said method further comprising the step of estimating a wind velocity from measurements of a least one parameter selected from the group comprising produced power, rotor speed, and pitch.

21. A wind turbine intended for being connected to a utility grid and intended for being operable during a period of time when the wind turbine is disconnected from the utility grid,
said wind turbine comprising at least one pitch-controlled rotor blade and a magnet generator intended for producing electric power during periods of time when the wind turbine is connected to the utility grid, and
said wind turbine being provided with means capable of adjusting an amount of the produced electrical power so that the produced electrical power is in balance with a required stochastic time-dependent consumption of a load,
of which at least one load is an electrical power consumer of the wind turbine, and said wind turbine comprising a power-producing element capable of producing electric power during periods of time when the wind turbine is disconnected from the utility grid,
said power-producing element being said magnet generator.

22. A wind turbine according to claim 21, wherein the magnet generator is a type comprising permanent magnets, which magnets during manufacture have been fully magnetized.

23. A wind turbine according to claim 21, wherein the magnet generator is a type comprising magnets, which magnets are capable of being magnetized during the periods of time when wind turbine is connected to the utility grid, and which magnets are subject to gradual de-magnetizing during the periods of time when the wind turbine is disconnected from the utility grid.

24. A wind turbine according to claim 21, wherein the magnet generator is a type comprising preliminary fully magnetized magnets, which magnets are structurally integrated with a synchronous or asynchronous induction generator, and which magnets are magnetically independent from any stator windings of the synchronous or asynchronous induction generator.

25. A wind turbine according to claim 21, wherein the magnet generator is a type comprising magnets being magnetized by the generator, which magnets are structurally integrated with a synchronous or asynchronous induction generator, and which magnets also are magnetically dependent of any stator windings of the synchronous or asynchronous induction generator.

26. A wind turbine according to claim 21, wherein the magnet generator is a type at least comprising a number of magnets being made from super conductive coils, alternatively only comprising magnets being made from super conductive coils.

27. A wind turbine according to claim 21, said wind turbine further comprising a converter capable of modifying the frequency of a voltage signal generated by said magnet generator.

28. A wind turbine according to claim 21, said wind turbine further comprising a converter capable of modifying the voltage amplitude of a voltage signal generated by said magnet generator.

29. A wind turbine according to claim 21, said wind turbine further comprising a filter for filtering an electric voltage signal generated by the magnet generator.

30. A wind turbine according to claim 21, said wind turbine further comprising at least one operational system selected from the group: of heating system, cooling system, lubricating system, de-humidification system and de-icing system, and wherein said at least one operational system is capable of maintaining the critical components operational.

31. A wind turbine according to claim 21, said wind turbine further comprising at least one of the following activities for dissipating power: supplying electric energy to a DC-chopper, mechanically pitching the at least one blade, acceleration of the rotor and of the rotor shaft.

32. A wind turbine according to claim 21, further comprising means for estimating the wind velocity, said means being selected from a group of wind velocity measuring means such as anemometers, means for measuring the rotational speed of the rotor shaft such as tachometers, rotor shaft torque measuring means such as strain gauges, and power measuring means such as power meters, and wherein said means is intended for assisting in adjusting the amount of the produced electrical power.

33. A wind turbine according to claim 21, further comprising a consumer of electrical power, which consumer is not forming part of the electrical consumers of the wind turbine being operational during the period of time when the wind turbine is connected to the utility grid, and which consumer is capable of consuming an amount of power that is constant and greater than zero over a period of time.

* * * * *